May 9, 1967

O. KNEISEL ET AL

TIME-SLOT RESERVATION FOR TRUNK CALLS IN PBX TELEPHONE SYSTEMS 3,319,008

Filed April 18, 1963

7 Sheets-Sheet 1

May 9, 1967 O. KNEISEL ET AL 3,319,008

TIME-SLOT RESERVATION FOR TRUNK CALLS IN PBX TELEPHONE SYSTEMS

Filed April 18, 1963 7 Sheets-Sheet 3

May 9, 1967 O. KNEISEL ET AL 3,319,008

TIME-SLOT RESERVATION FOR TRUNK CALLS IN PBX TELEPHONE SYSTEMS

Filed April 18, 1963

7 Sheets-Sheet 7

United States Patent Office 3,319,008
Patented May 9, 1967

3,319,008

TIME-SLOT RESERVATION FOR TRUNK CALLS IN PBX TELEPHONE SYSTEMS

Otto Kneisel, Gauting, and Albert Fisch and Horst Honold, Munich, Germany, assignors to Siemens & Halske Aktiengesellschaft Berlin and Munich, a corporation of Germany Filed Apr. 18, 1963, Ser. No. 274,062
Claims priority, application Germany, Apr. 19, 1962, S 79,089
10 Claims. (Cl. 179—18)

Figures 1, 2:
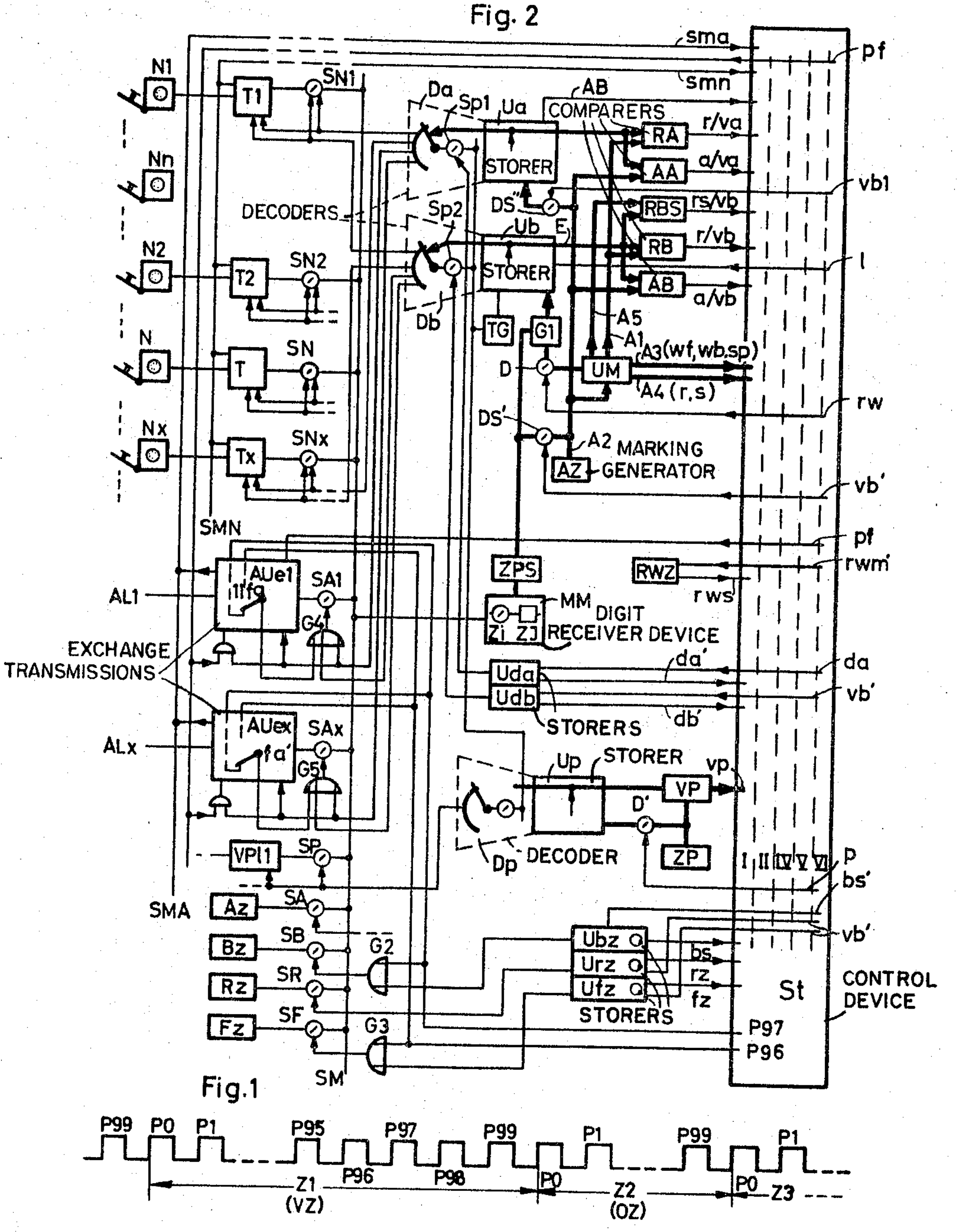

The invention disclosed herein is concerned with a circuit arrangement for a time multiplex communication system, especially a multiplex private branch exchange telephone system (PBX), wherein connections are established with the aid of pulses which are displaced as to time and respectively assigned to connections to be extended.

In known communication systems operating in accordance with the time multiplex principle, there is assigned a pulse phase (time slot) respectively to a calling station or an exchange transmission which had been seized in connection with an incoming call, all operations required for the extension of the corresponding call as well as for the exchange of messages over a time multiplex line, taking place at such pulse phase. The marking in a cyclic storer, of a calling station or of an exchange line which had been seized for an incoming call, is likewise effected with the aid of an idle pulse phase assigned to the corresponding call. In the event that no idle pulse phases are available, there is effected an internal blocking which prevents the extension of further calls.

The object of the invention is to reserve, in a time multiplex communication system, a definite number of pulse phases for the extension of particular calls, so as to assure processing thereof.

According to the invention, this object is realized by the provision of a counting device which ascertains idle trunk lines extending in a given traffic direction, such counting device also counting the idle (available) pulse phases and effecting after the counting of a definite number of idle pulse phases, depending upon the number of idle trunk lines or exchange lines extending in the respective traffic direction, transmission of a triggering signal for the control of the allocation of the pulse phase ascertained in the counting operation.

It is in this way possible to reserve in simple manner a number of idle pulse phases for the extension of particular connections (calls), depending upon the number of idle trunk or exchange lines leading to other exchanges. There will then always be available as many idle pulse phases as may be necessary for the extension of the particular calls. An unnecessary withdrawal of idle pulse phases for other connections which are to be established, is avoided. The control of the phase allocation is effected at a central point, thus keeping the required expenditure low.

The various features of the invention will appear from the description of an embodiment which will be rendered below with reference to the accompanying drawings, showing the details which are important for the understanding thereof. The illustrated embodiment is concerned with a system having lines extending between different exchanges, wherein the control of the operations as well as the intercoupling of the speech paths are effected in accordance with the time multiplex principle. However, the intercoupling of the speech paths or channels can likewise be carried out with the aid of a coupling- or cross-wire multiple while the extension of calls is effected according to the time multiplex principle.

FIG. 1 indicates in schematic manner a time diagram for the cycles and control pulses provided in a time multiplex communication system;

FIG. 2 represents an overall view of the devices of a system operating in accordance with the time multiplex principle; and FIGS. 3*a* to 5*b* show linking examples in connection with a central control device, so as to explain the recording, evaluation and delivery of markings. For tracing the circuits, FIGS. 3*b*, 4*b* and 5*b* should respectively be placed at the right of the FIGS. 3*a*, 4*a* and 5*a*.

The stages Z*a*1 to Z*a*6 of the counting arrangements Z1 to Z3 (FIGS. 3*a*, 4*a*, 5*a*) control the allocation of the pulse phases in such a manner, that there is always available a given number of idle pulse phases for incoming exchange calls.

For a better understanding of the time multiplex system which is here concerned, there will first be explained, with reference to FIG. 1, the relationship between cycles and phases.

The marking generator (counting device AZ in FIG. 2) furnishes the cycles and the beat generator or timer TG furnishes the phase sequence. The translator or converter UM in FIG. 2 is read out in a definite sequence, by the counting device AZ, and therefore offers at its output A1, for example, every 100 milliseconds, the same marking combinations (informations). This means that the marking generator AZ, for example, a ring counter, supplies at its output, at each beat, another marking of a first kind, for example, a line number, thereby initiating the operative connection of the resepctively associated markings of another kind, for example, call numbers, authorization information, etc., of the markings stored in the converter (for example, a magnet core storer), at the corresponding outputs A1, A3, A4 of the converter UM, in the same sequence. The markings of the first kind, for example, line numbers, given by the marking generator AZ, are not only used for the determination of the storage places in the magnet core storer, but also as so-called addresses for the cyclic storers U*a*, U*b*, represented in FIG. 2. If there are, for example, 1000 different markings of the second kind, for example, call numbers, stored in the converter UM, which are respectively allotted each to a station, the marking generator AZ must extend to the converter as well as to the cyclic storers, every 100 microseconds (corresponding to a pulse sequence frequency of 10 kilocycles) another marking of the first kind, for example, the line number of a station.

There is now supplied a marking to an input of a cyclic storer (FIG. 2), every 100 $\mu$sec., for an interval of, for example, 1 $\mu$sec. In order to make this possible, the respective marking is cycled in the cyclic storer, for example U*b*, upon magnetostrictive wires, in a 100 $\mu$sec. rhythm and is again connected at the input E always at the definite pulse phase at which the storing was effected. This makes it possible to compare the different markings which are extended by the cyclic storer, for example, U*b*, to the input E, in an interval of 100 $\mu$sec., with the marking supplied for this interval, by means of a special device which will presently be described. Accordingly, this determines whether the predetermined marking for the marking generator has already been entered (written-in) in any cyclic storer at any phase.

A definite pulse phase is as a socalled speech or call phase, assigned to any station desiring to extend a call, responsive to the removal of the receiver at the corresponding station. This pulse phase remains associated with the respective station during the extension of the call and for the duration thereof.

There are provided 100 pulse phases for the time multiplex system which is under consideration. A pulse phase is supplied, for example, every 100 μsec. The markings (informations) of a station therefore receive a definite pulse phase for the duration of the respective connection.

FIG. 1 indicates in the form of a time diagram the 100 pulse phases of a phase cycle. The pulse phases P1 to P94 are provided, for example, as socalled speech phases, and are respectively assigned to the connections for the entire time required for the extension of a call and for the duration of the extended call. The pulse phases P95 to P0 are control phases. Accordingly, a pulse phase P1 which is assigned to a given connection is after each respective cycle Z1, Z2, Z3, given every 100 μsec. All markings of the stations involved in the connection to which this pulse phase is assigned, and assuming that the number of one of these stations has at the same time been supplied by the marking generator AZ, are at the instant of appearance of the pulse phase P1, collected in the central control device S*t* and evaluated therein, dependent upon the respective operating condition thereof. The collection of information for the station number which is supplied by the marking generator AZ for an interval of 100 μsec., is effected within the information cycle (processing cycle) VZ. A corresponding marking will be stored in case it is ascertained at a pulse phase, for example, P1, that the station, the number of which is connected at the output of the marking generator AZ, is involved in the extension of a connection or partakes in an extended call. A renewed evaluation of ascertained markings is required in the event that a new marking is found in connection with the markings which had been stored at the indicated instant, which new marking had not been present during the preceding information cycle. This renewed evaluation is effected in the course of an operation cycle following the information cycle. The marking generator is in such case switched further, to the next station number, only upon conclusion of the operation cycle of 100 μsec., which is followed by another information cycle.

The operational, that is, the functional relations for a time multiplex telephone system will now be briefly described with reference to FIG. 2.

The system illustrated as an example, is a private branch exchange system (PBX) having the stations (extensions) N1 to N*x* and exchange lines AL1 to AL*x*. The stations N1 to N*x* can be connected with the speech multiplex terminal SM over the respective speech or call switches SN1 to SN*x* and the exchange transmissions AU*e*1 to AU*ex* can be connected therewith over the speech or call switches SA1 to SA*x*. These speech or call switches are controlled by pulses which are supplied with the cooperation of the cyclic storers U*a* and U*b*. Assuming that the pulse phase P1 is as a speech phase assigned to the exchange transmission AU*e*1 (exchange line AL1), the speech or call switch SA1 which is allocated to this exchange line will be closed every 100 μsec., always upon appearance of this pulse phase P1.

In the cyclic storer U*a* are normally stored the markings, for example, the line numbers, of calling stations and exchange lines seized in incoming direction by calling stations, and in the cyclic storer U*b* are stored the markings, that is, for example, the call numbers or line numbers (depending upon the operating condition) of called stations and exchange lines involved in outgoing calls. Markings of called stations are in given cases likewise stored in the cyclic storer U*a*. As already mentioned, the markings belonging to a connection always have the same pulse phase, so that these markings are at the same instants supplied at the outputs of the cyclic storer.

To the outputs of the cyclic storers U*a*, U*b* are connected so-called decoders D*a*, D*b*, respectively. Each decoder has as many outputs as there are stations and exchange lines. Accordingly, each of these outputs is assigned either to a station or to an exchange line. Each speech or call switch is connected with an output of the decoder D*a* and also with an output of the decoder D*b*. Or-gates (not shown) which are inserted in the respective connections, prevent mutual interference between the decoders. When the marking, for example, of a station number of an exchange line is conducted to a decoder, there is a pulse delivered at the output, which pulse is assigned to the respective exchange line. This pulse is utilized for the control of the speech switch which is assigned to this exchange line. In the event that a pulse (with the pulse phase assigned to a connection) appears at the same instant, for example, at the output of a decoder D*a* which output is assigned to an exchange line, and also at an output of the other decoder, which is allocated or assigned to a station, the speech switches assigned to the exchange line and station, will be temporarily closed, thus connecting the respective exchange line and station together for the duration of the corresponding pulse. This operation is periodically repeated, for example, every 100 μsec., with the cycling period of the markings, for example, station numbers, which are being cycled in the cyclic storers U*a*, U*b*, thus effecting the intended connection between the involved stations.

It shall now be assumed that the exchange transmission AU*e*1 is seized for the extension of a call between an exchange subscriber and the station N2 of the illustrated PBX system. The marking generator AZ successively connects, as already described, always for 100 μsec., a marking, for example, the number of an exchange transmission, at the output A2 and tests the operating condition of the respective exchange transmission. After a given interval, the marking generator AZ connects at the output A2 the number of the exchange transmission AU*e*1 which is in calling condition, and such calling condition is now tested at the appearance of the reading pulse P0 which is supplied by the control device S*t*. There being involved an exchange call, a marking is transmitted over the signal multiplex line *sma*, with the aid of switch SY, FIG. 3*a*, which connects the exchange transmission AU*e*1 with the signal multiplex line *sma*, to the control device S*t* (FIG. 2) for marking the calling condition. The criteria supplied by the exchange transmission AU*e*1 to AU*ex* and by the different subscriber line circuits T1 to T*x* appear, corresponding to the markings successively supplied by the marking generator AZ (line numbers of the stations and exchange transmissions), likewise successively at the respective signal multiplex lines *sma*, therefore avoiding mutual interference.

It must now be ascertained, with the aid of the control device S*t*, whether an idle pulse phase is available for the exchange connection which is to be established. In case a pulse phase is idle, the exchange connection can be established with the aid thereof. In case no pulse phase should be idle, particular measures must be taken, since it is generally undesirable to incur the loss of an incoming exchange call to a PBX station.

In case there is an idle pulse phase, it will be assigned to the exchange transmission seized for an incoming call, for the further extension of such call and for the duration thereof. Upon allocation of the idle pulse phase, for example, P1, the number of the exchange transmission is at such phase entered (written-in) in a cyclic storer U*a*. The entry of the number of the exchange transmission seized incident to an incoming call, is effected during an operating cycle of the central control device S*t*, which follows an information cycle. All markings (criteria) are stored in the control device S*t*, which are extended thereto during such cycle. During the operation cycle following the information cycle, the markings recorded incident to a pulse phase, are evaluated and entry impulses for the initiation of definite switching operations are thereupon supplied at the corresponding pulse phases. The control device S*t* supplies, after receipt of the call marking (criterion) in the cyclic storer U$a$, during an operation cycle, in the presence of the marking of the respective exchange transmission at the output of the counting device, for example, over the conductor $vb1$, an entry (writing-in) pulse, which effects closure of the switch DS'', thus effecting entry (writing-in) of the number of the respective exchange transmission standing at the output A2 of the marking generator AZ, in the cyclic storer U$a$, at the corresponding pulse phase, for example, pulse phase P1. The marking of the exchange transmission AU$e$1, which had been entered in the cyclic storer U$a$, cycles in such storer periodically with the sequence frequency of the pulse phase, thus appearing periodically, with this sequence frequency, that is, every 100 $\mu$sec., at the outputs of the cyclic storer U$a$. To these outputs is connected the decoder D$a$. Accordingly, to the decoder D$a$ is, at a definite instant, that is, at the pulse phase P1 of the seized exchanged transmission, conducted in coded form, the marking (criterion) of this exchange transmission AU$e$1. The corresponding impulse appearing in the decoder D$a$ is conducted to the respectively associated speech switch SA1, over the gate G4, since the switch S$p$1 is at the same instant, that is, at the phase P1, likewise closed by an impulse supplied by the control device S$t$ over the conductor $da$. The exchange transmission AU$e$1 is connected with the speech multiplex terminal SM over the switch SA1.

Upon entry of the number of the exchange transmission AU$e$1 in the cyclic storer U$a$, there is seized an idle digit ZJ, and the marking of an idle digit receiver in a (not illustrated) cyclic storer, is entered in the digit receiver device MM. The digit receiver ZJ is operatively connected to the speech multiplex terminal SM over the switch Z$i$ at the instant of connection of the exchange transmission to such terminal, at the seized pulse phase P1. The digit receiver ZJ receives the digits transmitted from the exchange subscriber which are, in the present embodiment translated from decadic impulses, for example, into plural frequency code signals. The digits transmitted in plural frequency code signals are by the digit receiving device MM converted or translated into binary direct current code signals and entered (written-in) in the cyclic storer U$b$, without intermediate storing, as digits of the number of the desired station. It may be mentioned here that a translation of decadically received selection impulses into plural frequency code signals, is required only in a case in which no plural frequency code signals are transmitted from the public exchange to the private branch exchange.

The entry of the number of the desired PBX station is always effected at the instant, for example, at the phase P1, at which the marking (number) of the exchange transmission appears at the output of the cyclic storer U$a$, since a cyclic storer in the digit receiving device MM, which is allocated to the cyclic storer U$a$. The direct current markings (criteria) are in connection with this entry of the desired call number checked by a not illustrated control device. The entry of the number of the desired station, at the instant at which the number of the exchange transmission AU$e$1 appears at the decoder D$a$ of the cyclic storer U$a$, assures that the entered (written-in) number of the called stations is periodically extended to the decoder D$b$ at instants which coincide with the pulse phase P1 which is assigned to the exchange transmission AU$e$1.

When the call number of the desired station is entered in the cyclic storer U$b$, a signal is given to the central control device S$t$ so as to ascertain whether the number of the desired station has or has not already been entered in one of the cyclic storers U$a$ or U$b$. This is accomplished by the comparers RA, AA; RB, AB, based upon the markings which happen to be present. Since the station number is important for the further building up of the connection, and not the line number which had been entered in the cyclic storer U$b$, such line number is translated (converted) into the respective station number which is after the testing for idle condition entered in the cyclic storer U$b$ to take the place of the line number. This entry is effected only upon ascertaining that the desired station number is not already being cycled either in the cyclic storer U$a$ or with the line number in one of the storers U$a$ or U$b$, respectively. The control device S$t$ thereupon supplies a control impulse for effecting entry, in the cyclic storer U$b$, of the station number assigned to the line number, to take the place of the number which had been entered therein.

The cyclic storer U$b$ is constructed exactly as the cyclic storer U$a$. The markings or criteria of the stations involved in a call are being cycled with identical phase in the two cyclic storers. To the cyclic storer U$b$ is connected the decoder D$b$, the outputs of which are connected with the speech switches associated respectively with the exchange transmissions and the stations. Between the output of the cyclic storer U$b$ and the decoder D$b$ is disposed the through switch S$p$2 (a similar through switch S$p$1 being disposed between the output of the cyclic storer U and the decoder D$a$) which interrupts the connection between the respective devices in the normal or resting condition thereof. The respective through switch can be impulse-wise closed so as to permit during such closures the passage, to the decoder D$b$, of the markings appearing at the outputs of the cyclic storer U$b$. The control device S$t$ supplies impulses for the actuation of the through switch S$p$2 only after ascertaining that the desired station is idle. A plurality of mutually independent markings which are being cycled with different phases can in this manner be supplied, thus simultaneously maintaining a plurality of connections, that is, as many as there are cyclic phases. The provision of the through switch S$p$2 makes it possible to eliminate special intermediate storers which would otherwise be required for storing the code numbers of called stations.

The entry (writing-in) impulse supplied by the control device S$t$ upon ascertaining that the desired station is idle, is cycled in the cyclic storer U$db$ with the same phase as the marking (call number) of the desired station is being cycled in the cyclic storer U$b$. Whenever the supplied pulse appears at the output of the cyclic storer U$db$, there is also supplied an impulse to the through switch S$p$2. These impulses constitute the required closure impulses. The auxiliary cyclic storer U$db$ as well as the cyclic storer U$da$, may comprise a timing member, formed by a wire of appropriate length, which is in a given case traversed by one or by a plurality of pulses. The pulses arriving at one end (discharge end) of the wire are again fed to the other end (the feed-in end) of the wire, thus resulting in periodic cycling of the respective impulses.

The markings (for example, line numbers) of the respective exchange transmissions such as AU$e$1 and by the respective stations such as N2, appear simultaneously at the outputs of the decoders D$a$, D$b$, whereby the corresponding connection is in pulse-wise manner switched through, every 100 $\mu$sec., at the respective pulse phase, for example, P1. Accordingly, the exchange transmission AU$e$1 and the called station N2 are over the respective speech switches SA1 and SN2, upon each repetition of the pulse phase P1, connected with the speech multiplex terminal SM.

Changes effected in the operating condition indicated by markings of a station involved in a connection, are ascertained at the instant when the marking generator AZ connects the address of the respective station to its output. Depending upon the operating condition, the control device S$t$ will then effect an operating cycle, following the information cycle, and the marking generator AZ will be switched further to the next line number at the conclusion of the operation cycle. Based upon evaluations carried out during the operation cycle, the control device S$t$ which comprises partial devices or sections I to V (see also FIGS. 3$a$ to 5$b$), will give definite commands in the form of entry impulses. These entry impulses affect cyclic storers, for example, over switches, so as to cause the respective cyclic storers to supply at the appropriate instants, for example, at the pulse phase P1, markings for the release of definite switching operations.

Depending upon the combination of the markings which are conducted to the central control device S*t*, there are affected gate circuits and flip-flop circuits which are arranged in a partial device or section II for the marking storage (FIGS. 3*a* to 5*a*). The recording of the markings is always effected at the pulse phase assigned to the connection which is to be extended. As already mentioned, the pulse phases P1 to P94 are provided as speech phases which are respectively assigned to connections for the extension and for the entire duration thereof. In addition to these speech phases, there are provided the pulse phases P95 to P0, as control phases. For example, at the pulse phase P0 is effected the scanning (sampling) of the signal multiplex lines, so as to ascertain the presence of a call condition, it being understood that switching operations respectively for a station or an exchange transmission designated by numbers supplied by the marking generator AZ, for the extension (building up) of a call and for maintaining it are, for example, required only in the presence of a closed subscriber line loop or in the presence of an exchange call. If no operations are to be executed, a command storer (flip-flop stage) which is arranged in the partial device or section V (FIGS. 3*b*, 4*b*, 5*b*) is at the pulse phase P96 restored to normal so as to be ready for new control commands. The marking recorded in an information storer of the marking storage in the partial device II (FIGS. 3*a*, 4*a*, 5*a*) is transmitted to a command storer, at the pulse phase P97. In the event that an operation cycle is required after the information cycle, further information recording in the partial device II, for the marking storage, is blocked at the phase P98, thus blocking further switching of addresses from the marking generator AZ. A phase storer is provided so as to assure that a result in the form of an entry impulse is obtained in the operation cycle, at the phase assigned to the calling party, for a marking recorded at a pulse phase in the partial device II. This is effected by marking by an impulse, in a phase storer, the phase assigned to the respective calling station, the phase storer being operative to deliver in the operation cycle, after about 100 μsec., an impulse which designates the respective phase.

There will now be described the construction of the control device S*t* and thereafter, with reference to FIGS. 3*a*–3*b*, 4*a*–4*b*, 5*a*–5*b*, the evaluation of markings required for the allocation (assignment) of pulse phases.

The central control device S*t* may, for example, be subdivided into eight partial devices or sections as follows:

I. Partial device (section) for the marking receipt or recording;

II. Partial device (section) for the marking storage;

III. Partial device (section) for phase storage;

IV. Partial device (section) for marking processing;

V. Partial device (section) for command storage;

VI. Partial device (section) for command execution;

VII. Partial device (section) for cycle control; and

VIII. Partial device (section) for controlling the pulse allocation.

The control device S*t* is connected over incoming conductors with the available cyclic storers, the signal multiplex lines, the comparers and the storer UM, and receives from the respective lines and devices information in the form of impulses and markings. The received markings are in the central control device S*t*, over gate circuits and flip-flop circuits provided in the above indicated stages, linked in such a manner, that a result is for each marking combination obtained at the output of the control device. The respective result is in the form of entry impulses, serving as control commands, conducted to the various devices, for example, over switches, to the cyclic storers. The marking impulses and entry impulses conducted respectively to and issuing from the control device, are indicated in FIG. 2 by directional arrows.

Upon appearance of the marking of a line at the output of the marking generator (counting device AZ), there are first collected, in the partial stage or section I (FIGS. 3*a*, 4*a*, 5*a*) of the control device S*t*, the markings stored during an information cycle in cyclic storers. For example, markings are during an information cycle delivered by the comparers RA–AA, RB–AB, giving information as to whether or not the line numbers standing in the marking generator AZ (FIG. 2) agree respectively with the call numbers or line numbers stored in the cyclic stores U*a*, U*b*. From the subscriber line circuit, for example, line circuit T1 of the Station N1 is supplied a marking concerning the condition of the respective line loop. The line number standing in the marking generator AZ is used for the identification of the respective station. Special signals coming respectively from the cyclic storers or the storer UM can likewise be conducted to the control device S*t* by way of particular outputs. All these marking impulses and markings characterize a definite condition which may in given cases require the release of particular functions, for example, the extension (building up) of a connection, the allocation of an exchange transmission, the interruption of an existing connection, etc. The linking circuits distributed in the control device S*t* over the various stages, translate or convert in given cases the received markings into control commands. These control commands are in the course of an operation cycle following the information cycle, conducted, for example, to the respective cyclic storers such as U*a*, U*b*, U*da*, U*db*, U*bz*, U*rz*, U*fz*, etc. or, for example, to the switches such as D, DS′, DS″, as entry (writing-in) impulses therefor.

An information cycle is always assigned only to one single station, that is, to the station for which the marking generator AZ supplies for the 100 μsec., the marking, for example, the line number. The information cycles are successively allocated (assigned) to the stations of the system. The line numbers which are successively connected to the output A2 of the marking generator AZ (FIG. 2) are utilized for this purpose. If it is found, based upon the markings conducted to the control device S*t*, that no control command is to be executed, there will follow another information cycle until control commands are obtained, whereupon an operation cycle is effected. The receipt (recording) of markings by the control device S*t* is blocked during the operation cycle in order to reliably avoid falsification of previously supplied information by subsequent information.

The operations effected in the control device S*t* are controlled with the aid of special impulse sequences. This socalled program operation is controlled by program phases, for example, the pulse phases P96, P98, P99 and P0. For example, the scanning or sampling of the signal multiplex lines is effected at the pulse phase P0, in order to ascertain whether a subscribed line loop is closed or open, since switching operations for the lines allocated respectively to the numbers given by the marking generator AZ for the extension of a connection for maintaining it are necessary only when the line loop is closed. The same applies in the case of appearance of a call signal over an exchange line.

In the event that no operation is to be performed, the command storer V (FIGS. 3*b*, 4*b*, 5*b*) is set to zero in preparation for receiving new control commands. The processing result of the information is transmitted to the command storer at the phase P97. In case an operation cycle is required after the information cycle, the information receipt is blocked at the cycle P97, so that the further switching of the address by the counting device AZ is omitted. A phase storer is provided which takes care that a result is also obtained in the operation cycle for a marking recorded at a phase, with the pulse phase which is allocated to the calling line for which the evaluation is effected.

Different examples will now be described for the operation of the control device St, especially with respect to the allocation of idle pulse phases. In order to assure that incoming exchange calls are in any case processed, it is necessary to reserve pulse phases for such calls. Principally, there shall always be reserved idle pulse phases corresponding in number to the number of exchange transmissions which can be seized for incoming calls, but not more than, for example, five. Exchange transmissions which can be seized for incoming calls are transmissions which are oriented in incoming direction and also non-directional exchange transmissions which are provided for incoming as well as for outgoing exchange traffic.

The reserving of pulse phases can be effected based upon the counting of the idle exchange transmissions or based upon the counting of the occupied exchange transmissions which can also be seized for the incoming exchange traffic.

Any idle exchange transmission can be ascertained at the instant when the marking generator AZ, FIG. 2, connects the respective exchange transmission at its output A2. The number of occupied (seized) exchange transmissions which can also be seized for the incoming exchange traffic, can be ascertained in different ways. Each seized (occupied) exchange transmission is recognizable by the zero at the first place of the marking stored respectively in the cyclic storer *Ua* or *Ub*. The exchange transmissions which can be seized in incoming direction, can be distinguished from the exchange transmissions which can be seized only in outgoing direction, at the second place of the marking stored in the cyclic storers *Ua* or *Ub*. However, it may be more appropriate to mark an occupied exchange transmission which can be seized in incoming direction, in an individual storage wire, with the aid of a marking impulse in the seizure phase *hu*. It is likewise possible, to ascertain from the converter or translator UM, the information whether a seized exchange transmission can or cannot be seized in incoming direction.

The allocation of an idle pulse phase is in known systems always effected respectively incident to the marking of a line loop condition or the marking of the call condition connected at the output A2 of the marking generator AZ. All idle pulse phases are in each information cycle, for an interval of 100 μsec. newly entered in the phase storer *t* (section III in FIGS. 3*b*, 4*b*, 5*b*). The reservation of pulse phases to be hereinafter described, is effected so that a definite number of pulse phases is, in the presence of a marking at the output of the marking generator AZ, for example, respectively of a station or of an exchange line which may be seized in outgoing direction, blocked in the central control device, thus reserving, for example, five phases, wehreupon the sixth idle pulse phase is assigned to the calling line. However, if a call signal is present for the seizure of an exchange line, the control for the phase allocation is made inoperative when the marking generator AZ connects at its output A2 the marking of the corresponding exchange transmission, and the first idle pulse phase is made available for the seized exchange transmission, for the extension of the connection and for the duration thereof. There will now be described various possible embodiments.

1.—*Phase reservation by means of counting in each information cycle the exchange transmissions seized in incoming direction*

It shall be assumed that the marking generator AZ, FIG. 2, has connected at its output the station N1 at which the receiver had just been removed. A marking impulse is now given from the line circuit T1 over the signal multiplex line *smn* to the central control device St shown in FIGS. 3*a*–3*b*. This marking impulse is recorded in the partial device or section I by placing the gate K1 at the phase P0 in operated position. This results, in an information cycle, with a marking on conductor 1, in placing the flip-flop circuit TA over the gates K2 and K3 in operated position. Accordingly, the operations mark the condition in which the station loop is closed at the phase P0, at the instant at which the respective station is marked at the output A2 of the marking generator AZ. The flip-flop circuit TA is placed in operated position only when a Yes-marking is connected to the conductor 1. The flip-flop circuit VZ (section VII in FIG. 3*a*) is in such case at normal or the flip-flop circuit TD (section VII, FIG. 3*b*) is in operated position and an information cycle is accordingly operative.

Over the conductors *r/va*, *a/va*, *r/vb* and *a/vb*, over which the central control device St receives marking impulses from the comparers RA–AA and RB–AB (FIG. 2), are delivered markings which signify that the present marking of the station N1 is or is not entered at any phase either as a call number or as a line number, in one of the cyclic storers *Ua* or *Ub*. It is in this way possible to mark whether the station N1 has already been entered and thus marked as busy, or has not been entered and marked as busy. In the present case, the party at the station N1 has just removed the receiver, so that it may be assumed that the marking of such station is not entered at any of the phases P1 to P94 in one of the cyclic storers *Ua* or *Ub*. Accordingly, the flip-flop circuits A/VA, A/VB (FIG. 3*a*) remain in their initial positions. At the input 2 of the gate K5 lies a Yes-marking, for example, a negative potential, and at the input 3 of this gate K5, a No-marking, for example, positive potential. This marking is over the output 4 of the gate K5 conducted to the gate K6. The flip-flop circuits TE, EF, EB (section V, FIG. 3*b*), insofar as operated, are at the phase 96 restored to zero, by a pulse extended over conductor 5, so as to be ready for receiving new markings. At the phase P97 appears a marking at the gate K6, opening such gate and placing the command storer TE by way of the output 6 in operated position. This results in preparatorily placing a Yes-marking on an input of the gate TE over the conductor 7 extending from the flip-flop circuit TE.

A marking is also conducted to the flip-flop circuit TD (FIG. 3*b*, section VII), under control of the command storer TE. The flip-flop circuit TD is thereby placed in normal position, thus preventing renewed storing of information incident to the next cycle, since there is then no Yes-marking or criterion on the conductor 1. No further switching pulse for the marking generator AZ is given over the output 8 of the flip-flop circuit TD. The flip-flop circuits of the partial device or section II (FIG. 3*a*) are placed in normal position at the phase P98. Since there is no Yes-marking at the conductor 1, owing to the restoration to normal, of the flip-flop circuit TD, the information cycle will now be followed by an operation cycle.

Figure 3A:
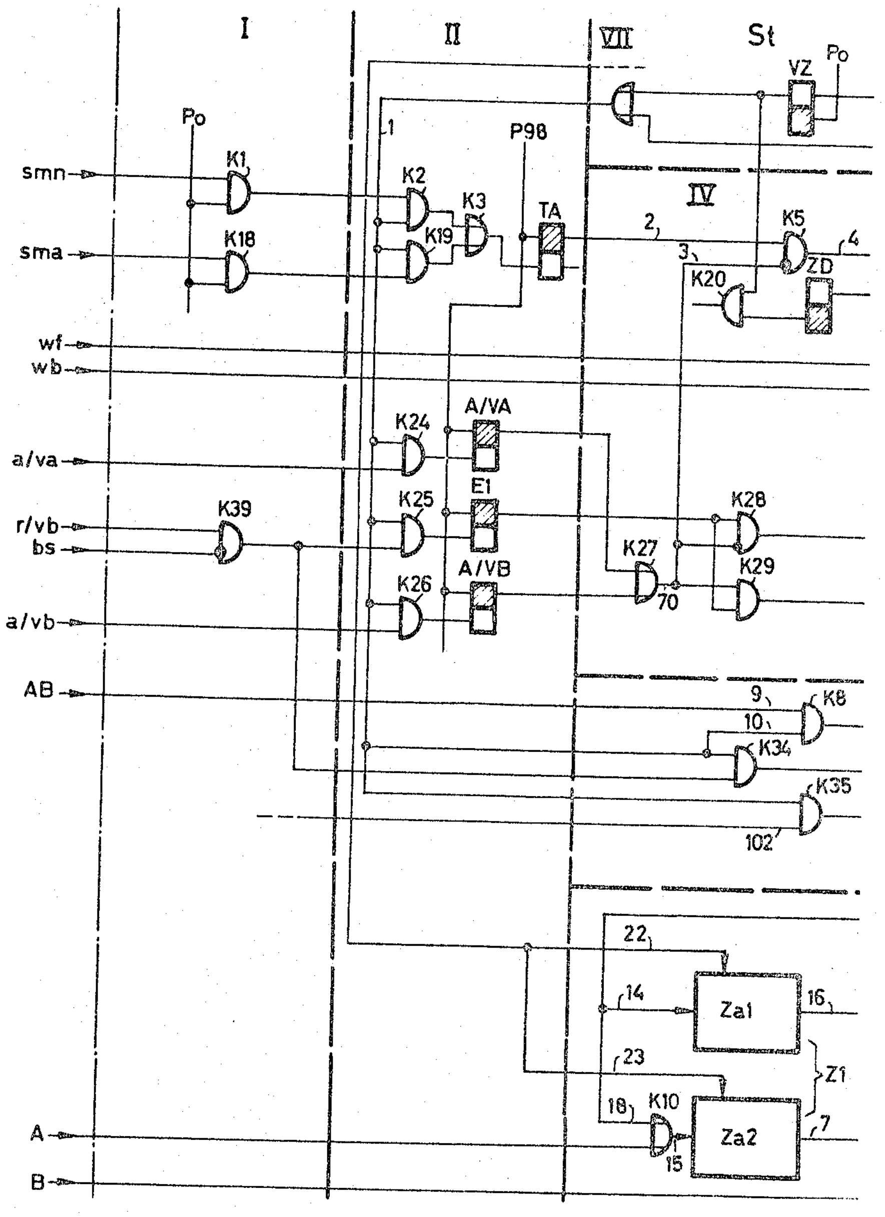
Figure 3B:
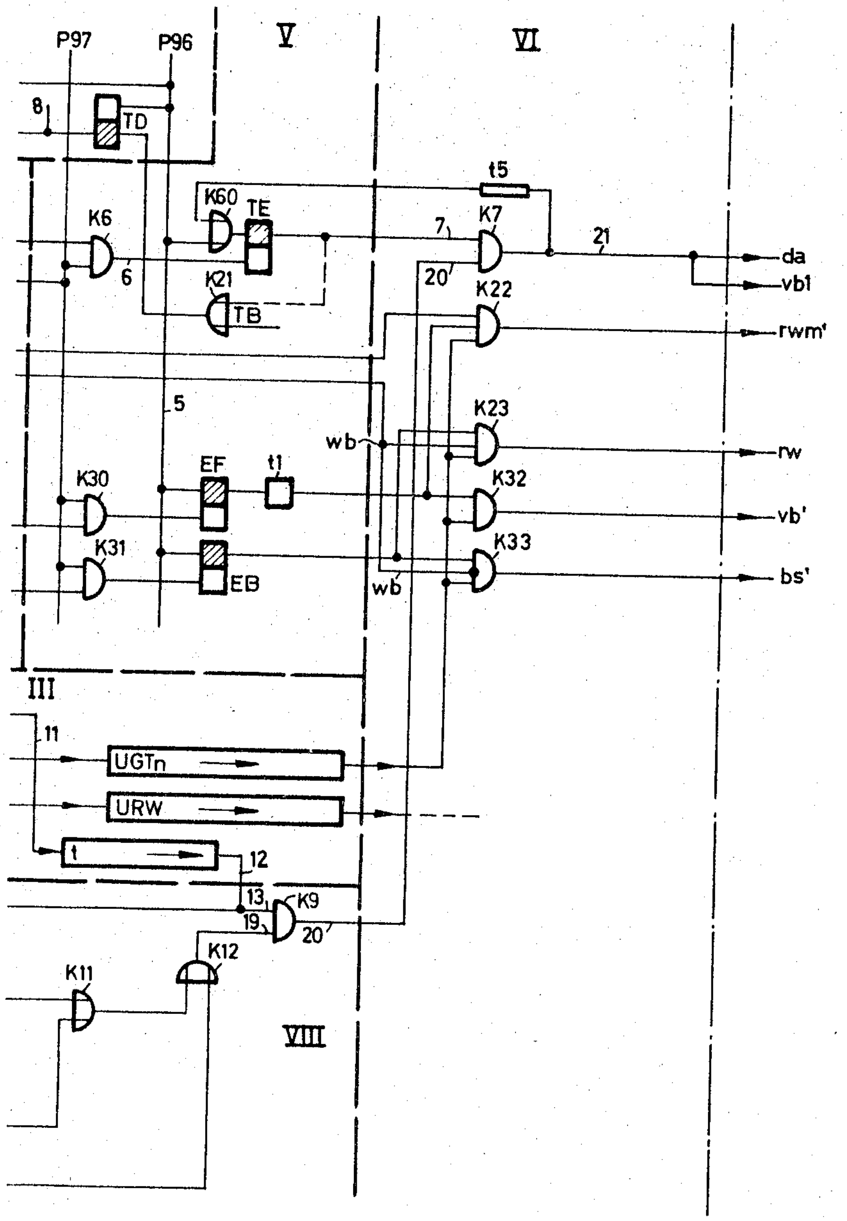

A marking is during the information cycle always at an idle pulse phase connected to the conductor AB (left in FIG. 3*a*), for example, from the cyclic storer *Ub*, FIG. 2, such marking being extended to the input 9 of the gate K8 (FIG. 3*a*, section III). Idle pulse phases are thus obtained, for example, in the cyclic storer *Ua*. A Yes-criterion is at the input 10 of the gate K8 (FIG. 3*a*, section III) when the flip-flop circuit VZ (FIG. 3*a*, section VII) is at normal or when the flip-flop circuit TD (FIG. 3*b*, section VII) is in operating position, that is, when an information cycle is present. Accordingly, the idle pulse phases are successively entered (written-in) in the timing member *t* (FIG. 3*b*, section III). The timing member *t* is a phase storer which discharges in the operating cycle at its output the received pulse phases after about 100 μsec. The impulse supplied during the information cycle to the input 11 of the timing member *t*, for example, at the phase P1, is again given off at the output 12 during the operation cycle. Accordingly, there is in the operation cycle, always at an idle pulse phase, a Yes-criterion at the input 13 of the gate K9 (FIG. 3*b*, section VIII). These criteria or markings are however also extended to the stage Z*a*1 of the counting device Z1 (FIG. 3*a*, section VIII), over input 14 and to the stage Z*a*2 of the counting device Z1 over the gate K10 and the input 15.

The stage Z*a*1 of the counting device Z1 can also be switched or stepped ahead by the supplied pulses, for example, always from 1 to 5. Accordingly, the stage Z*a*1 which contains, for example, five flip-flop stages, can be with each impulse conducted thereto stepped ahead by one unit. Upon having been stepped ahead in an operation cycle, from 1 to 5, the stage Z*a*1 extends incident to the next arriving impulse an impulse at its output 16. Accordingly, the stage Z*a*1 of the counting device Z1 gives off at the output 16, the first impulse always, for example, for the sixth impulse which is being stored.

The stage Z*a*2 of the counting device Z1 counts from 1 to 40. An impulse is given off at the output 17 of this stage Z*a*2, only when this stage had been stepped on, in the operation cycle, from 1 to 40, that is, always responsive to the receipt of the 41st impulse. The stage Z*a*2 is not stepped on only by the pulses which are in the operation cycle given at the idle pulse phases, but also by the pulses which are supplied from a special cyclic storer for the exchange transmissions which can be seized in incoming exchange traffic. For example, if there are available 40 exchange transmissions for incoming exchange traffic and 38 of these exchange transmissions are busy, this stage Z*a*2 is stepped to 40 already upon storing two further marking impulses given for idle pulse phases over the input 18 and the gate K19. A criterion is thereby conducted, at the third idle pulse phase, over the Or-gates K11 and K12 to the gate K9 (FIG. 3*b*, section VIII). Accordingly, there are in such case already after the third idle pulse phase, Yes-criteria connected at the input 13 and at the input 19 of the gate K9, and a Yes-criterion is also at the third pulse phase connected at the input 20 of the gate K7 (FIG. 3*b*, section VI). A Yes-criterion is therefore connected at the selected idle pulse phase to the output 21 of the gate K7, such criterion being extended over the conductor *da* as an entry impulse to the cyclic storer U*da* (FIG. 2). This causes at the corresponding idle pulse phase closure of the switch S*p*1. The switch DS″ is likewise operatively actuated by the action of the entry pulse, in a circuit extending from the output 21 of the gate K7 over the conductor *vb*1, thus causing entry in the cyclic storer U*a* of the marking standing at the output of the marking generator AZ (FIG. 2).

The switch S*p*1 is by the impulse entered in the cyclic storer U*da* operatively actuated every 100 μsec., and a corresponding marking is thereby also given every 100 μsec., for the line number had been entered in the cyclic storer at the respective phase. The station N1 is thereby at the corresponding phase connected with the speech multiplex terminal SM over the switch SN1.

The present case dealt with a call extended from the station N1. In case there are, for example, 5 or more exchange transmissions (see also FIGS. 3*a* and 3*b*) idle, there will also have to be reserved, for example, five idle pulse phases, that is, only the sixth idle pulse phase must be freed for the extension of an outgoing connection of the PBX station N1. In such case, there is connected in the operation cycle, to the output 16 of the counting device Z1 (FIG. 3*a*, section VIII) a criterion or marking, only after the storage of the sixth impulse. An impulse is conducted over the Or-gates K11 and K12 to the input 19 of the gate K9, thereby opening the gate K7 as already described. Over the conductors *da* and *vb*1 are transmitted entry impulses which cause, among others, the entry of the marking of the calling station in the cyclic storer U*a*.

In the presence of a marking of an exchange transmission at the output A2 of the marking generator AZ (FIG. 2), there is connected at the conductor B, for example, from the storer UM, a signal for marking the corresponding condition in the control device S*t*.

In such case, a Yes-criterion is connected directly to the input 19 of the gate K9 (FIG. 3*b*, section VIII), thereby by-passing the stages Z*a*1 and Z*a*2 of the counting arrangement Z1, that is, without reserving idle phases, and connecting a marking to the input 20 of the gate K7. Accordingly, there is in such case extended from the output of the marking generator AZ (FIG. 2) an entry impulse to the switch D″. Therefore, the corresponding marking is without reservation of idle phase immediately entered in the cyclic storer U*a*.

A restoring impulse is at a control phase, for example, P96, placed on the inputs 22 and 23 of the stages Z*a*1 and Z*a*2 at the counting device Z1, such impulse restoring these stages to zero, thus placing them in readiness for renewed setting incident to the next information cycle.

Each stage comprises in known manner, for example, a plurality of flip-flop stages which are by an impulse brought from one stable condition to another stable condition. For example, if all flip-flop stages of a stage are in actuated position (open), a further impulse conducted to the corresponding stage will be extended to the output thereof.

2.—*Phase reservation by means of counting per cycle of the marking generator AZ exchange transmissions seized for incoming calls*

If the busy condition is to be established with the aid of the marking generator AZ, the phase reservation can be effected only for the interval of an entire passage (cycling) of the markings in the marking generator AZ. The number of the pulse phases which are to be reserved is fixed after the marking generator AZ has ascertained all exchange transmissions which can be seized in incoming direction, and cannot be changed until the end of the next cycling of the markings. It is important in this connection that the number of transmissions which can be seized in incoming direction remains fixed for the interval of a cycling (passage) of all markings stored in the marking generator. An embodiment for the corresponding operations will now be described with reference to FIGS. 4*a*, 4*b*.

Figure 4A:
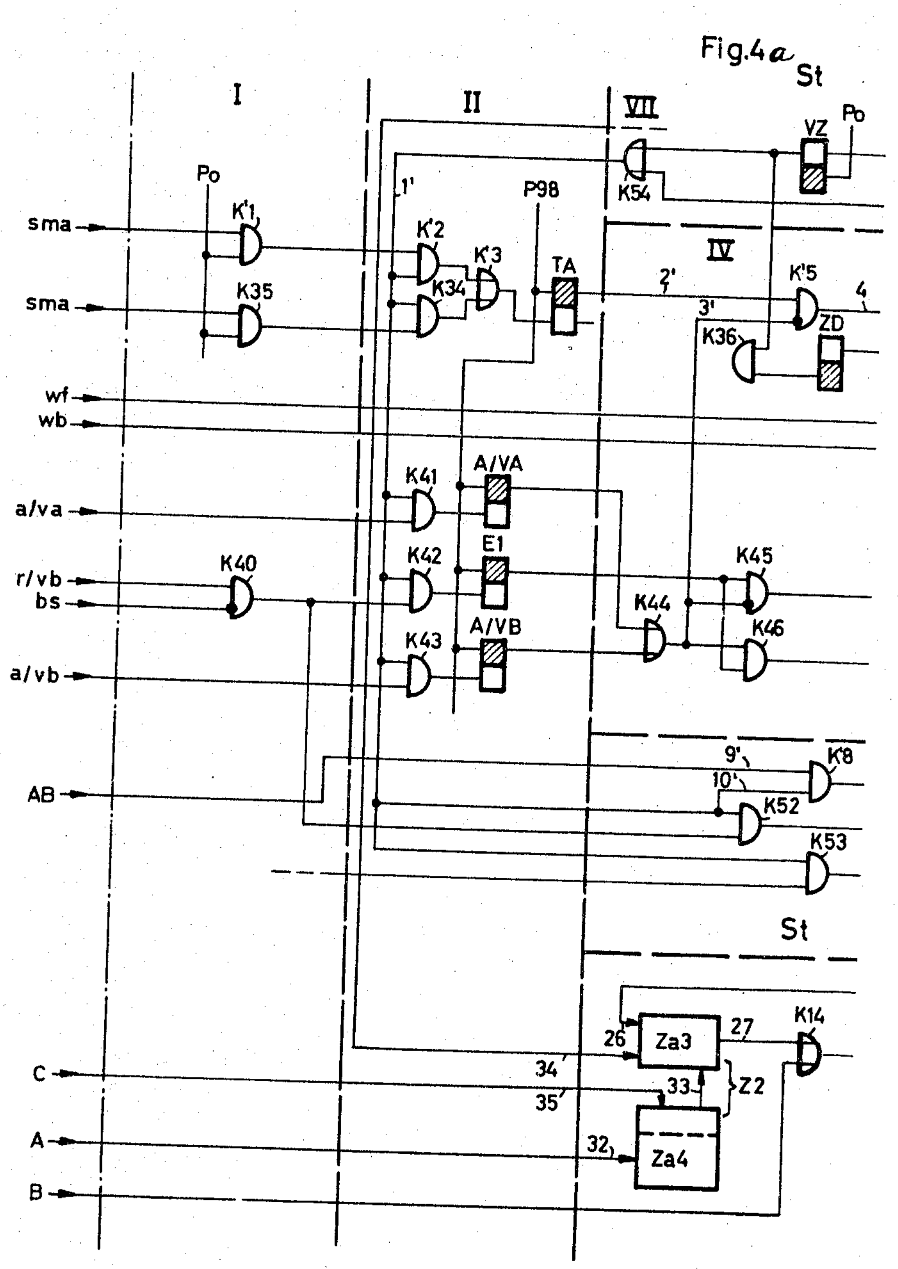
Figure 4B:
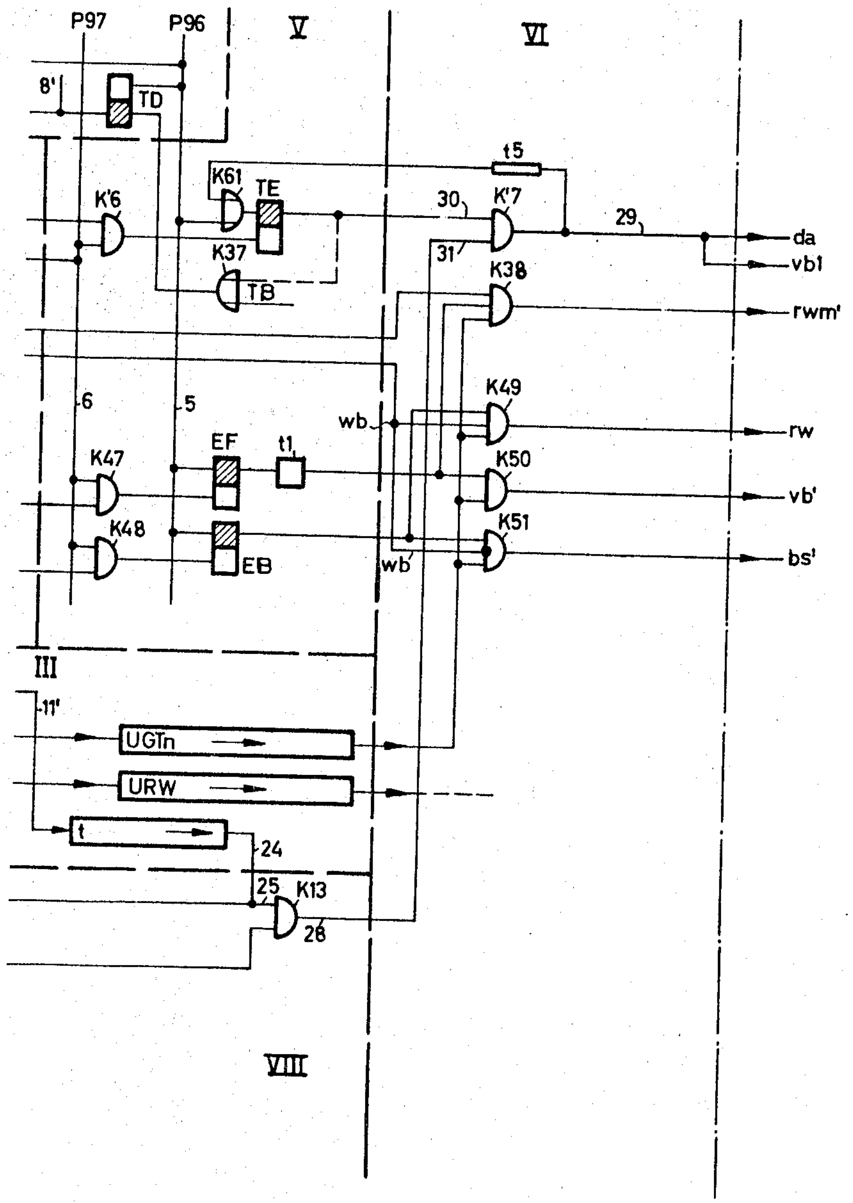
Figure 5A:
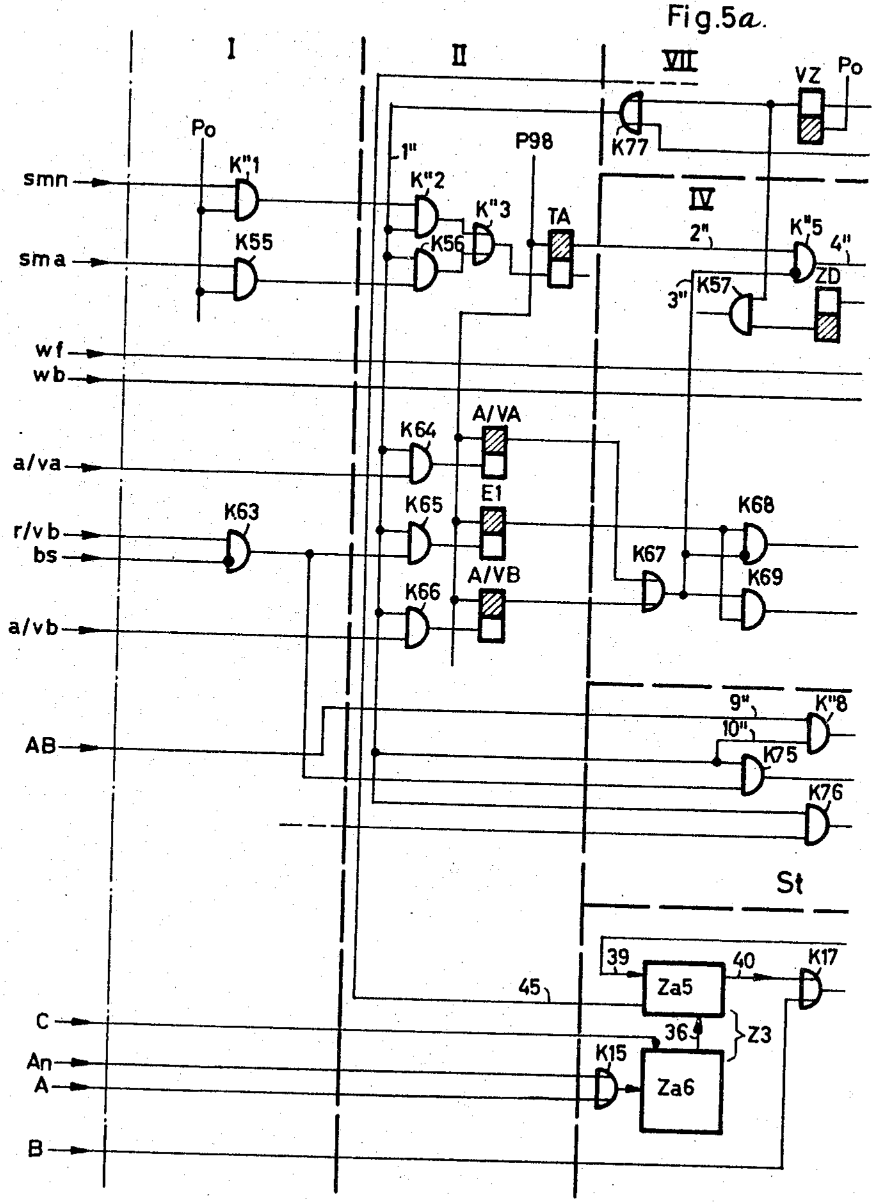
Figure 5B:
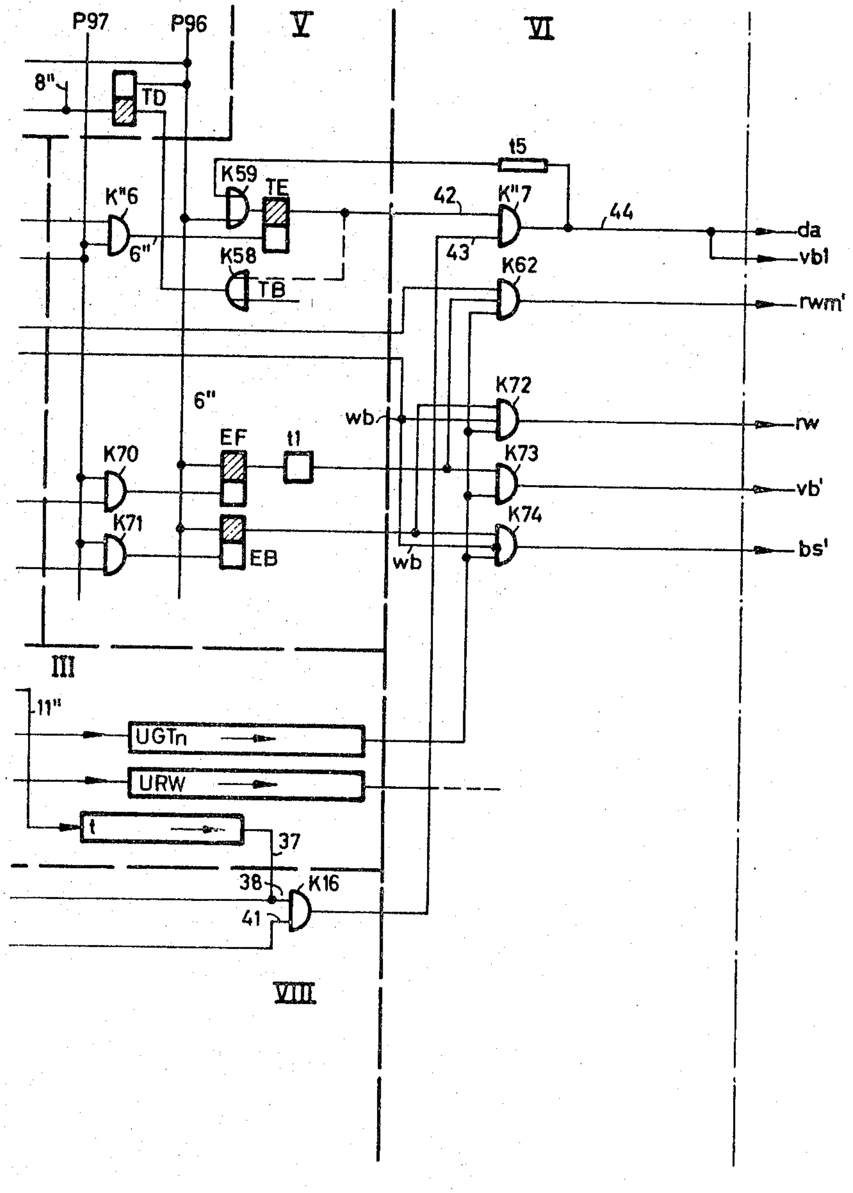

As has been explained in connection with the previous example, described under the heading "1," the allocation of an idle pulse phase is effected responsive to the presence of a call signal from a calling station or from an exchange line which had been seized in incoming direction. An impulse is for this purpose in the information cycle always entered in the phase storer *t* (FIG. 4*b*, section III), with the corresponding phase, for an idle phase, such impulse appearing in the operation cycle after about 100 μsec. at the output of this phase storer. Accordingly, at the output 24 of the phase storer *t* always appear, with the respective pulse phase, impulses which are respectively extended to the input 25 of the gate K13 and to the input 26 of the stage Z*a*3 of the counting device Z2. The stage Z*a*3 is stepped on by the received impulses, always by one step, for example, for a maximum of 5 steps. The stage Z*a*3 which comprises, for example, a number of flip-flop stages, is thus stepped ahead by one unit (flip-flop stage) for each impulse. When the stage Z*a*3 has stepped on, in the operation cycle, from 1 to 5, it will be responsive to the sixth impulse of the pulse phase conducted to the input 26 thereof, extend an impulse to its output 27. Accordingly, there is extended a first impulse always for the sixth impulse received for storing. This impulse is over the gate K14 conducted to the gate K13 so that a marking appears responsive to the selected sixth pulse phase on the output 28 of the gate K13, which marking or criterion opens the gate K'7 (FIG. 4b, section VI). Since there are Yes-criteria on the inputs 31 and 32 of the gate K'7, a Yes-criterion is also extended over the output 29 of the gate K'7, thus resulting in the extension of entry (writing-in) impulses over the conductors *da* and *vb*1. There is in this manner effected the storing of the marking, in the cyclic storer U*a*, of the station from which a call signal had been received, and also the storing, in the cycle storer U*da*, of an impulse in preparation for the actuation of the switch S*p*1, such storing being carried out at the seized phase as already explained in the description under the heading "1."

The stage Z*a*4 of the counting device Z2 counts from 1 to 40, for example, when there are provided 40 exchange transmissions which can also be seized in incoming direction. To this stage Z*a*4 is conducted, for example, from the storer UM, FIG. 2, for each such exchange transmission which had been seized, a marking over the conductor A and the input 32. The counting of these exchange transmissions in the stage Z*a*4 is always effected for the time of a passage (cycling) of all markings standing in the marking generator AZ, that is, always for 100 milliseconds. The seized (busy) exchange transmissions are counted down at the start of each cycling. The number of flip-flop stages in the stage Z*a*4, which are brought into actuated position (opened), corresponds to the number of seized exchange transmissions. For example, if there are more than 35 of the 40 exchange transmissions seized, the stage Z*a*4 will in each information cycle extend for the counts 36, 37, etc., an impulse to the input 33 of the stage Z*a*3. Accordingly, the stage Z*a*3 of the counting device Z2 is in the information cycle by the 36th, 37th, etc., impulse stepped ahead and thereby preset. For example, if there are already supplied two impulses from the stage Z*a*4 to the stage Z*a*3, thus marking that 37 exchange transmissions are already busy, the stage Z*a*3 will be stepped on to the 5th step (flip-flow stage), responsive to the presence of a call signal from a PBX station, by the first three idle pulse phases given over the input 26 of the stage Z*a*3. Accordingly, a marking is connected at the output 27 of the stage Z*a*3 already by the fourth impulse which is given based upon an idle pulse phase. A Yes-criterion is thereby over the gates K14 and K13 conducted to the input 31 of the gate K'7, such gate supplying at this instant, that is, at the seized idle pulse phase, at its output 29 an entry impulse, based on the markings connected to its inputs 30, 31. As already explained in the description under the heading "1," an impulse with the respective pulse phase is thereby stored in the cyclic storer U*da* (FIG. 2). The switch DS" (FIG. 2) is likewise actuated, by the entry impulse given over the conductor *vb*1 extending from the output 29 of the gate K'7, whereby the marking standing at the output A2 of the marking generator AZ, is entered in the cyclic storer U*a*.

Upon appearance of the marking of an exchange transmission, at the output A2 of the marking generator, there will be connected to the conductor B (FIG. 4*a*), for example, from the storer UM (FIG. 2), a criterion for marking the corresponding condition in the central control device S*t*. In such a case, as already explained in the description under the heading "1," there is conducted to the gate K'7, in the first idle pulse phase, a criterion directly over the gates K14 and K13.

The setting of the stage Z*a*3 of the counting device Z2 is always effected upon transmitting impulses, given from the stage Z*a*4, in the information cycle, for the respectively required new presetting. However, it is likewise possible to set the stage Z*a*3, in suitable manner to zero, and to suitably reset it again. The zero position of the stage Z*a*3 is secured if the stage had not been stepped ahead by more than 35 steps (flip-flop stages), during a cycling (passage) of the markings of the marking generator AZ. An impulse is given over the conductor C, from the storer UM, for the zero setting of the stage Z*a*4, responsive to the cycling of the last criterion of the markings stored in the marking generator AZ.

3.—*Phase reservation by means of counting the idle exchange transmissions which can be seized in incoming direction*

The seizure or busy condition is in this example likewise ascertained by means of the marking generator. The phase reservation is always effected only for the interval of a complete cycling (passage) of the markings in the marking generator AZ. After the marking generator has at the start of the cycling ascertained all exchange transmissions which can be seized in incoming direction, the number of the pulse phases which are to be reserved is fixed and it does not change until the end of the next cycling of the markings. It is accordingly, in this operation, likewise important that the number of busy transmissions which had been seized in incoming direction, remains stored for the interval of cycling of all markings stored in the marking generator AZ. The corresponding embodiment is described below with reference to FIG. 5.

The stage Z*a*6 is upon operative connection of the arrangement, preset to 5, in order to assure such presetting in the event that the marking generator AZ is not in the zero position.

The respective stages Z*a*5 and Z*a*6 of the counting device Z3 (FIGS. 5*a*, section VIII) can be stepped ahead from 1 to 5, that is, for example, up to five flip-flop stages can be placed in operating position with the aid of appropriate impulses. For example, the stage Z*a*5 is set from zero to three or five, by the impulses for the presetting of exchange transmissions transmitted to the stage Z*a*6 and given by the latter to Z*a*5 over the input 36. Assuming that the stage Z*a*5 had been over the input 36 preset to the step 3 (third flip-flop stage), such stage is reset by impulses for the idle pulse phases, given over the conductor 39, so that an impulse can be connected at the output 40 thereof only after the 4th idle pulse phase. Accordingly, the stage Z*a*5 is preset, by the impulses given from the stage Z*a*6, from zero to three, whereupon it is by the first 3 idle pulse phases set from 3 to 2 to 1 and thereupon to zero, so that the 4th idle pulse phase can be utilized for initiating the operations already described.

The stage Z*a*6 of the counting device Z3 is over the conductor A and the gate K15 set, by impulses marked in the storer UM, for the idle exchange transmissions which can be seized in incoming direction. The setting is effected up to 5, that is, there are provided, for example, 5 flip-flop stages in the stage Z*a*6. The idle exchange transmissions which can be seized in incoming direction are newly counted down always at the start of the cycling of all markings of the marking generator AZ. For example, in case 5 such exchange transmission are marked as being idle, the count of the stage Z*a*6 is, in an information cycle, transferred to the stage Z*a*5. Accordingly, the count condition of the stage Z*a*5 is in each information cycle corrected in accordance with the count of the stage Z*a*6.

It shall be assumed that the stage Z*a*5, as seen from the input 36 at which the stage Z*a*6 counts from 1 to 5, is preset to 5. Upon placing now, during an information cycle, at an idle phase, an impulse from the phase storer *t* (FIG. 5*b*, section VIII) on the conductor 37, such impulse is not only extended to the input 38 of the gate K16 but also to the input 39 of the stage Z*a*5, and such stage, which had been set to 5, is reset to step 4. A marking is extended over the output 40 of the stage Z*a*5, only responsive to the sixth impulse. Accordingly, a Yes-criterion is conducted over the gate K17 to the input 41 of the gate K16, only at the 6th idle pulse phase, such criterion being extended to the input 43 of the gate K"7. The latter gate K"7 is opened by the Yes-criteria at its inputs 42, 43, so that entry impulses are extended over the conductors *da* and *vb*1 which extend from the output 44 of gate K"7.

As already explained in the description under the heading "1," the marking of the station from which the call signal had been received, is now entered in the cyclic storer $Ua$, and in the cyclic storer $Uda$ is stored an impulse which initiates the operative connection of the corresponding speech switch, with the seized pulse phase, to the speech multiplex line.

In the event that less than five exchange transmissions which can be seized in incoming direction, are idle, in which case the stage $Za6$ is set, for example, to 3, whereby the stage $Za5$ is in an information cycle likewise set to 3, the stage $Za5$ set back by the impulse given for each idle pulse phase. An impulse is extended to the gate K17 only at the 4th idle pulse phase. Accordingly, the gate K16 is opened, by the idle pulse phase over the gate K17, and the delivery of an entry impulse to the cyclic storer $Ua$, for initiating the marking corresponding to the station from which the call signal had been received, is as already described effected over the conductor 43.

In the presence of a marking of an exchange transmission, at the output A2 of the marking generator AZ, a marking is connected to the conductor B, for example, from the storer UM, FIG. 2, as already explained in the description under the heading "2," to indicate that the marking of an exchange transmission which can be seized in incoming direction, stands at the output A2 of the marking generator. The allocation of the first idle pulse phase is in such case directly effected, as already described.

The resetting of the stage $Za6$ to zero position is effected from the storer UM, over the conductor C, when all markings of the marking generator have once been cycled.

Changes may be made within the scope and spirit of the appended claims which define what is believed to be new and desired to have protected by Letters Patent.

We claim:

1. A circuit arrangement for a time multiplex communication system, especially private branch exchange telephone system, wherein the extension of calls is controlled by pulses which are displaced as to time and allocated to the respective calls, comprising a counting device, operative to ascertain idle exchange lines which can be seized in a given traffic direction and to count idle pulse phases, and being further operative, depending upon the number of idle exchange lines and after counting a definite number of idle pulse phases, to supply a signal for the control of the allocation of a pulse phase to a connection which is to be established.

2. A circuit arrangement according to claim 1, comprising a marking generator, a central control device including switching means in the form of gates and flip-flop circuit and also including a counting device having a plurality of stages, said counting device being in the presence of the marking at the output of the marking generator, of a station involved in a call, operative to ascertain during an interval for the recording of information, in a first stage, the number of idle pulse phases, and being further operative, responsive to obtaining a total result, to extend from said stage a marking, with the idle pulse phase ascertained in the counting, a criterion for activating switching means included in said central control device so as to effect transmission of an entry impulse for the initiation of operations required for the extension of a call which is to be established.

3. A circuit arrangement according to claim 1, comprising a marking generator, a central control device including switching means in the form of gates and flip-flop circuits and also including a counting device having a plurality of stages, said counting device being in the presence of the marking at the output of said marking generator, of a station involved in a call, operative to ascertain during an interval for the recording of information, in a first stage, the number of idle pulse phases, and to count in a second stage, the number of exchange lines which have been seized in a given traffic direction, and to add to the number of exchange lines the number of idle pulse phases, and being further operative, upon obtaining from said second stage a definite total result, to transmit with the pulse phase determined by the counting, a criterion for activating switching means included in said central control device so as to effect transmission of an entry pulse for the initiation of operations required for the extension of a call which is to be established.

4. A circuit arrangement according to claim 1, comprising a marking generator in which are cycled markings denoting connections, a central control device including a counting device having a plurality of stages, and circuit means for transmitting upon the stepping ahead of the marking generator from one to another marking, an impulse for resetting predetermined stages of said counting device.

5. A circuit arrangement according to claim 1, comprising a marking generator in which are cycled markings denoting connections, a central control device including a counting device having a plurality of stages, and circuit means for transmitting upon the stepping ahead of the marking generator from the last stored marking to the first stored marking, impulses for resetting predetermined stages of said counting device.

6. A circuit arrangement according to claim 1, comprising a marking generator, comparison means, a central control device having switching means in the form of gates and flip-flop circuits, said comparison means being in the presence of markings, at the output of the marking generator, of exchange lines for calls extending in given traffic directions, operative to produce an impulse for the activation of switching means included in said central control device, so as to initiate the marking of idle exchange lines.

7. A circuit arrangement according to claim 1, comprising a cyclic storer for the cycling of markings denoting calling PBX stations, a central control device including switching means in the form of gates and flip-flop circuits, a switch for controlling the storing of markings of calling stations in said cyclic storer, and means for transmitting a signal for the activation of switching means included in said central control device, said signal causing operative actuation of said switch so as to effect storage of the marking of a calling station in said cyclic storer.

8. A circuit arrangement according to claim 1, comprising a marking generator, a central control device including a counting device having a plurality of stages, a first stage of said counting device being during an interval for recording information, effective to ascertain the number of idle pulse phases, a second stage of said counting device being operative to ascertain from markings which are successively connected at an output of the marking generator, respectively for the cycling of all markings, the number of exchange lines which had been seized in a given traffic direction, and being further operative, when a definite number of seized exchange lines is at the start of each time interval for the recording of information, exceeded, to transmit a corresponding number of impulses to another stage of the counting device.

9. A circuit arrangement according to claim 8, wherein said first stage of said counting device is, in the presence of the marking of a PBX station at the output of the marking generator during an interval for the receipt of information in the central device, operative to count the number of idle pulse phases and compare therewith the number of idle exchange lines ascertained from number of seized exchange lines determined in the second stage, and further operative, responsive to the presence of a greater number of idle pulse phases than of idle exchange lines, to transmit for the idle pulse phase ascertained, a criterion for activating switching means in said central control device so as to effect transmission of an entry pulse for the initiation of operations required for the extension of a call which is to be established.

10. A circuit arrangement according to claim 8, wherein impulses conducted to an input of the first stage effect presetting of such stage to a definite value, impulses corresponding to idle pulse phases being conducted to another input of said stage effecting restoration thereof to its initial position, whereby said stage is upon receipt of a definite number of impulses denoting idle pulse phases, operative to release a criterion for the activation of switchin means of the central control device.

No references cited.

KATHLEEN H. CLAFFY, *Primary Examiner.*

WILLIAM C. COOPER, *Examiner.*